United States Patent
Lutz

US005744549A

[11] Patent Number: 5,744,549
[45] Date of Patent: Apr. 28, 1998

[54] FLOURINATED POLYURETHANE COATED GOLF BALLS

[75] Inventor: Mitchell E. Lutz, Fairhaven, Mass.

[73] Assignee: Acushnet Company, Fairhaven, Mass.

[21] Appl. No.: 664,974

[22] Filed: Jun. 3, 1996

[51] Int. Cl.$^6$ .............................. A63B 37/12; C08L 75/04
[52] U.S. Cl. .................. 525/129; 528/70; 473/374; 473/377; 473/378; 427/393.5; 427/412.1
[58] Field of Search ..................... 528/70; 525/129, 525/131; 473/374, 377, 378, 378.1; 427/393.5, 412.1

[56] References Cited

U.S. PATENT DOCUMENTS

| | | | |
|---|---|---|---|
| 2,911,390 | 11/1959 | Smith | 528/70 |
| 4,477,643 | 10/1984 | Keller | 528/70 |
| 5,409,233 | 4/1995 | Kennedy . | |
| 5,461,109 | 10/1995 | Blair | 524/839 |
| 5,494,291 | 2/1996 | Kennedy | 525/123 |

FOREIGN PATENT DOCUMENTS 2285401  7/1995  United Kingdom .

*Primary Examiner*—David Buttner
*Attorney, Agent, or Firm*—Pennie & Edmonds LLP

[57] ABSTRACT

The present invention is directed towards golf balls comprising a core, a cover and a coating composition layer, wherein the coating composition layer comprises a fluorinated polyurethane. The novel fluorinated polyurethane coating composition of the present invention enhance a variety of properties such as enhanced abrasion, impact and weathering resistance as compared to golf balls with conventional coating composition. Additionally, the presently claimed fluorinated polyurethane coatings also decrease the coefficient of friction of the surface of the golf ball, resulting in a modification of the spin rate when struck with a golf club and superior cleaning characteristics.

23 Claims, No Drawings

FLOURINATED POLYURETHANE COATED GOLF BALLS

FIELD OF INVENTION

This invention relates generally to a coating for use on golf balls wherein the coating comprises a fluorinated polyurethane. The presently claimed coated objects possess a variety of desirable properties such as enhanced abrasion, impact and weathering resistance to the ball. Additionally, the coatings also decrease the coefficient of friction of the coated surface.

BACKGROUND OF THE INVENTION

Conventional golf balls can be classified as one-piece, two-piece, and three-piece (also known as "wound" balls). One-piece balls are molded from a homogeneous mass of material and have a dimple pattern molded on their surface. Two-piece balls are made by molding a cover about a solid core. Three-piece or wound balls are made by molding a cover about a wound core. The core is typically made of rubber and can be solid, semi-solid or have a liquid center. A wound core is prepared by winding a lengthy thread of elastic material about a solid, semi-solid or liquid center. The wound core is thereafter surrounded with a cover material. A more recent trend in the golf ball art is towards the development of multi-component golf balls such as balls with two or more core layers, two or more cover layers or both multiple core and multiple cover layers.

The covers of presently available golf balls are typically formed from a variety of materials such as balata, polyurethane and ionomer resins such as SURLYN® and IOTEK®, depending upon the desired performance characteristics of the golf ball. One of the softest materials conventionally used in forming golf ball covers is balata, which is the trans form of the 1,4-chain polymer of isoprene. For many years, balata was the standard cover stock material for most golf balls. Balata covered balls are favored among professionals and more advanced amateur players because the softness of the cover allows the player to achieve spin rates sufficient to more precisely control ball direction and distance, particularly on shorter approach shots. However, because of its softness, balata is susceptible to cuts or other damage to the cover resulting from a "mis-hit" shot.

Accordingly, harder, more durable cover materials such as ionomer resins, e.g., SURLYN® have been developed, which provide higher durability, but less spin and feel than the balata balls. Ionomeric resins are generally ionic copolymers of an olefin such as ethylene and a metal salt of an unsaturated carboxylic acid such as acrylic acid, methacrylic acid or maleic acid. Metal ions, such as lithium, zinc or sodium are included to neutralize some portion of the acidic groups in the copolymer. The result is a thermoplastic elastomer suitable for use as a golf ball cover. Various softening comonomers such as n-butyl acrylate are often added during the ionomer manufacturing process to improve golf ball performance characteristics such as spin and feel. Further, in the early 1980s, low modulus SURLYN® ionomers were introduced and subsequently utilized to impart more spin and an improved, balata-like feel to golf balls constructed with this material.

Golf balls are provided in a variety of colors. Conventionally they are white, but they may be manufactured with essentially any desired color, including yellow, orange and pink. The color is imparted either by layers of paint applied to the outer surface of the ball or by incorporating a pigment directly into the cover composition. Typically, in a painted ball, a first or primer layer of paint is applied, followed by a second, i.e. finishing coat or layer. After a ball has been colored, identifying indicia such as a trademark, logo, identification number, model name and/or number and the like are stamped onto the ball.

It is important that golf balls be capable of withstanding a variety of weather conditions such as sunlight, extreme temperature ranges, and immersion in water, preferably for an extended period. Further, the surface of a golf ball is flexed every time it is impacted with a club and consequently it must be able to withstand repeated stresses without damage to the cover. Moreover, especially with the recreational player, golf balls are susceptible of striking any of a number of hard, abrasive surfaces such as concrete, asphalt, brick, stone, and the like as a result of errant shots and their resistance to such impact and abrasion is another important feature.

Naturally, it is further desirable for golf ball manufacturers that their golf balls be resistant to delamination or chipping of the paint layers, as such aesthetic defects impact negatively upon the public perception of the quality of the golf ball. Likewise, golf ball manufacturers prefer to prevent obliteration of all or part of their trademarks, logos or other identifying indicia which identifies the brand of the ball to the playing public.

Conventionally, coating compositions are applied to the ball surface to protect the ball, the identifying indicia and any paint layers, and to add a pleasing appearance to the ball due to their high gloss and the mirror-like surface they produce. Typically, such coatings comprise a clear primer coat and a clear top coat, although for certain applications a single coating composition layer may suffice.

The term "coating composition", as used herein, means a coating applied to the outer surface of the golf ball which is transparent and which imparts a glossy or shiny appearance to the coated surface, as well as providing a measure of protection and durability thereto. Coating compositions are generally free of pigmentation and are water white. However, they may contain small amounts of dye, pigment, and optical brighteners. In golf balls of the type described above, the various identifying indicia may be applied to either the cover, the prime coat or the coating composition.

Protective coating composition materials are well known in the golf ball art. Generally, they consist of urethanes, urethane hybrids, polyesters and acrylics. In particular, a cured polyurethane top coat is most widely used as a protective coating composition material. Typical two pack polyurethane coatings include separate packages of polyol and diisocyanate which are mixed together to yield a thermoset coating composition. Conventionally, a primer layer such as a solvent-based or other polymer may be applied to promote adhesion or to smooth surface roughness before the finish coat(s) are added to the golf ball.

While the conventional polyurethane coating compositions described above do provide a measure of abrasion and impact resistance, as well as protection against weathering, a continuing need exists for compositions useful in forming such coating composition layers having improved properties for use with existing equipment and technology.

SUMMARY OF THE INVENTION

It has now been discovered that the presently claimed fluorinated polyurethane coating compositions impart improved wear characteristics and an enhanced aesthetic appearance to golf balls as compared to conventional polyurethane coating compositions. Additionally, it has been discovered that the presently claimed fluorinated polyurethane coating compositions can reduce the coefficient of friction of the coated surface. Such a reduction in coefficient of friction provides a modification of the spin rate of a ball when the ball is struck with a golf club. Additionally, a lower surface energy coating provides a ball having superior cleaning characteristics.

The present invention is directed in a first embodiment towards the novel use of fluorinated resins in protective coating compositions for application to golf balls.

The present invention is thus directed towards improved protective coating composition layers adapted for application to golf balls, which provide enhanced abrasion and impact resistance, enhanced weathering properties and a reduced coefficient of friction of the surface of golf balls having such coatings.

The present invention is further directed towards fluorinated polyurethane coating compositions having a plurality of poly(tetrafluoroethylene) particles dispersed therein.

In a further embodiment, the invention is directed towards a golf ball comprising a core, a cover and a coating composition layer upon at least a portion of an outer surface of said cover, wherein the coating composition layer comprises a fluorinated polyurethane coating composition comprised of a reaction product of a fluorinated polyol and a curing agent, preferably an isocyanate.

The present invention is still further directed towards a method for making a golf ball having a coating composition layer comprising a fluorinated polyurethane coating composition formed by a method comprising reacting at least two diols, wherein the diols are either both fluorinated or one is fluorinated and the other is unfluorinated, to form a fluorinated polyol, optionally dispersing the fluorinated polyol in a solvent, adding a curing agent to the polyol/solvent mixture or neat polyol, depositing the polyol/solvent/curing agent mixture or neat polyol/curing agent mixture onto the outer surface of a golf ball and curing the mixture to form a fluorinated polyurethane.

The present invention is yet further directed towards a golf ball having a coating composition layer comprising a fluorinated polyurethane, wherein the fluorinated polyurethane is created by reacting at least two diols, wherein the diols are either both fluorinated or one is fluorinated and the other is unfluorinated, to form a fluorinated polyol, optionally dispersing the fluorinated polyol in a solvent, adding a curing agent to the polyol/solvent mixture or neat polyol, depositing the polyol/solvent/curing agent mixture or neat polyol/curing agent mixture onto the outer surface of a golf ball and curing the mixture to form a fluorinated polyurethane.

DETAILED DESCRIPTION OF THE INVENTION

The invention is directed in one embodiment toward a golf ball which can include a core, a cover and a coating composition layer deposited upon the cover, wherein the coating composition layer comprises a fluorinated polymeric compound(s). The preferred fluorinated polyurethane coating compositions of the present invention can impart a number of enhanced properties as described below to golf balls employing such coatings, as compared to those coated with conventional polyurethane coating compositions.

Without limiting the invention to a single theory, the desirable properties of the present fluorinated polyurethane coating compositions are believed to be a result of the presence of the fluorine atom in the chemical structure of these compounds. That is, the carbon-carbon backbone of fluoropolymers such as fluorinated polyurethane is strengthened when fluorine is attached to the backbone. For example, the carbon-carbon bond energies of a perfluoroethane are 406 kj/mol as compared to 368 kj/mol for ethanes. Furthermore, compared to an unfluorinated analog, a polymer containing fluorine has a lower equilibrium moisture absorption, a lower dielectric constant and a lower index of refraction. Likewise, fluoropolymers demonstrate excellent thermal stability and resistance to oxidative attack. Moreover, fluorinated polymers also have low surface energies. Consequently, as a result of the presence of fluorine in their chemical structure, the fluorinated polyurethane coating compositions used in the present invention can have a lower coefficient of friction, lower moisture absorption, higher abrasion resistance, lower index of refraction, easier cleanability and increased chemical inertness as compared to conventional polyurethane coating compositions.

The fluorinated polyurethane coating compositions used in the present invention can be formed by the reaction of a fluorinated polyol and a curing agent or by any other method known to the artisan of ordinary skill. A variety of fluorinated polyols may be chosen for reaction with the curing agent, as would be readily apparent to one of ordinary skill in the art. Such fluorinated polyols can be derived from a variety of fluorinated diols. Substantially any fluorinated diols, such as aromatic, unsaturated and aliphatic diols, may be employed to produce the fluorinated polyols employed in the present invention as a coating for the balls. As for the curing agent, any curing agent known in the art for curing urethanes can be used, with isocyanates being the preferred class of curing agents for this purpose.

In a preferred embodiment of the invention, diols having the following chemical structures are preferred for forming the fluorinated polyols used in forming the coated balls of the invention:

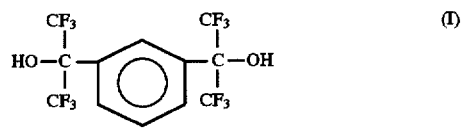

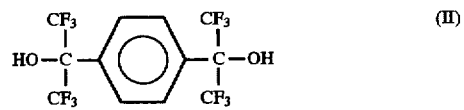

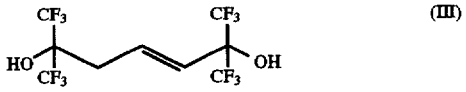

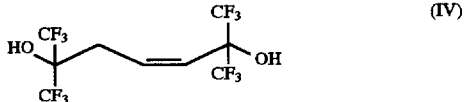

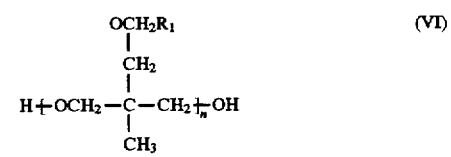

wherein $R_1 = C_nF_{2n+1}$ wherein $n \geq 1$.

Of course, as one of ordinary skill in the art would immediately recognize, mixtures of these diols, with or without additional diols known in the art, may also be used in forming the coated objects of the invention.

In a further preferred embodiment of the invention, the fluorinated polyols are synthesized by refluxing a mixture of diols 1 and 2 above with an equimolar amount of either diol 5 or diol 7 or a mixture of diols 3 and 4, with epichlorohydrin and an excess of sodium hydroxide in a solution of acetone containing a small amount of water. The reaction can be monitored by gas chromatography and reflux can be discontinued as soon as the starting diols have disappeared. The resulting polyol can be washed with water until free of base and than dried at 120° C., producing a light amber solid in yields of 87 to 97%.

One of ordinary skill in the art would recognize that in the art of organic synthesis, many different synthetic protocols can be used to prepare a given compound. Thus the fluorinated polyols employed in the present invention can be synthesized by a variety of synthetic routes known to the skilled organic chemist. Different routes can involve more or less expensive reagents, easier or more difficult separation or purification procedures, straightforward or cumbersome scale-up, and higher or lower yield. The skilled chemist knows well how to balance the competing characteristics of synthetic strategies. Thus, the fluorinated polyols used in the present invention are not limited by the choice of synthetic strategy, as any synthetic strategy that yields a fluorinated polyol can be used.

An example of a suitable fluorinated polyol commercially available is a material sold under the trade name Poly-FOX by GenCorp Areojet of Sacramento, Calif.

The fluorinated polyol is reacted with a curing agent in order to form the fluorinated polyurethane coating compositions used in the present invention. Preferably, the fluorinated polyol is dissolved in a suitable solvent prior to its reaction with a curing agent. Any urethane-grade solvents known in the art may be employed. Examples of preferred solvents include methyl isobutyl ketone, methylamyl ketone, methyl isoamyl ketone or a mixture of n-butyl acetate and xylene or mixtures thereof.

Any conventional agent used for curing urethanes, which agents are well known in the art, may be utilized. Isocyanates are preferred for this purpose. In a particularly preferred method of forming the fluorinated polyurethanes of the present invention, a biuret trimer of hexamethylene diisocyanate (HMDI) is employed as a curing agent in order to maximize the resistance of the resultant coatings to weathering and chemical attack. The chemical structure of a preferred biuret 8 of hexamethylene diisocyanate is illustrated below.

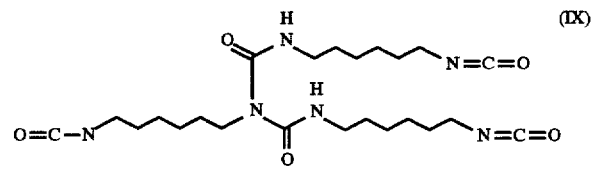

(IX)

If desired, a catalyzing agent may also be employed, i.e., to catalyze the cure of the polyol. Any conventional catalyzing agent may be utilized. An example of a preferred catalyzing agent is dibutyl tin dilaurate (DBTDL).

The fluorinated polyurethane produced by the method described herein may be dissolved in a suitable solvent to facilitate its application to the surface of a golf ball.

Any urethane-grade solvents known in the art, such as those disclosed above, may be employed in the present invention.

The fluorinated polyurethane compounds may be employed in any amount that will desirably modify the surface properties of the coated golf ball. In particular, the fluorinated polyurethane compounds should be present in an amount sufficient to impart enhanced abrasion, impact and weathering resistance. If desired, a sufficient amount for imparting a decrease in the coefficient of friction may be applied.

Accordingly, the cured coating composition comprises about 1% to about 100% by weight fluorinated polyurethane. Preferably, the cured coating composition comprises about 10% to about 100% by weight fluorinated polyurethane. Most preferably, the cured coating composition comprises at least about 50% to about 100% fluorinated polyurethane. Preferably, the balance of the cured coating composition comprises a conventional, i.e., non-fluorinated polyurethane. Any of the polyurethanes known in the art may be utilized. Polyurethane results from the reaction between a polyurethane prepolymer and a curing agent. The polyurethane prepolymer can be the product of a reaction between a polyol and a polyisocyanate. Curing agents such as polymines, glycols and diols can be used to cure polyurethane. A catalyst can be employed to promote the reaction between the curing agent and the polyurethane prepolymer.

Conventionally, there are two categories of polyurethane on the market, thermoset and thermoplastic. Thermostet polyurethanes are cured through crosslinking upon the substrate. Thermoplastic polyurethanes, on the other hand, are prereacted isocyanate and polyol or amine dispersed in solvent and cured through drying. Possible precursors for manufacturing thermoplastic and thermoset urethanes include, but are not limited to, 4,4'-diphenylmethane diisocyanate (MDI) or 3,3'-dimethyl-4,4'-biphenylene diisocyanate (TODI), and a polyol cured with a diol, such as 1,4-butanediol. In particular, thermoset polyurethanes are made from a polyisocyanate, such as 2,4-toluene diisocyanate (TDI) or methylenebis-(4-cyclohexyl isocyanate) (HMDI), and a polyol which is cured with a polyamine, such as methylenedianiline (MDA), or a trifunctional glycol, such as trimethylol propane, or tetrafunctional glycol, such as N,N,N',N'-tetrakis(2-hydroxypropyl)ethylenediamine.

Conventional polyether polyols include polytetramethylene ether glycol; poly(oxypropylene) glycol; and polybutadiene glycol. Conventional polyester polyols include polyethylene adipate glycol; polyethylene propylene adipate glycol; and polybutylene adipate glycol. Conventional polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives include slow-reacting polyamine group consisting of 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate; or a difunctional glycol; and mixtures thereof. 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP. A preferred glycol is PTMEG, poly(tetra-methylene ether) glycol.

Suitable bifunctional glycols are 1,4-butanediol; 1,3-butanediol; 2,3-butanediol; 2,3-dimethyl-2,3-butanediol; dipropylene glycol; and ethylene glycol. Difunctional glycols are inherently slow-reacting.

Accordingly, conventional polyurethanes can be made from any of numerous commercially available aromatic, aliphatic and cycloaliphatic isocyanates, diisocyanates and polyisocyanates.

The fluorinated polyurethane may be formed from a coating solution comprising a mix ratio of about 1:1 (OH to NCO). However, it may be preferable to have an excess of curing agent, i.e., NCO. Additionally, the coating solution may comprise between about 65% to about 80% by volume of a solvent. Preferably, the coating solution comprises about 10%–65% solvent.

In addition to the components discussed above, a variety of particulate materials may optionally be added to the coating compositions to modify the surface properties of the material. Any particulate materials conventionally employed in the coating composition art, such as pigments, dye, optical brighteners, flow agents, slip and mar agents, fillers, catalysts, mixtures thereof and the like may be utilized. For example, $TiO_2$ may be included as an opacifier or hiding pigment. Alternatively, or in addition, hard, abrasion resistant particulate materials such as silica particles may be added to the present coating compositions to enhance the abrasion resistance of the coating composition.

Additionally, due to the low surface energy of the present fluorinated polyurethane compositions, low surface tension particulate material may also be included. In particular, the surface energy of the fluorinated polyurethane compositions of the invention are comparable to that of poly (tetrafluoroethylene), sold commercially under the tradename Teflon®. Thus, a plurality of poly(tetrafluoroethylene) particles may be incorporated into the compositions to further enhance the durability and weathering, cleaning and surface friction reducing properties of the compositions used in coating the claimed objects.

It is preferable that the overall percentage by volume of the poly(tetrafluoroethylene) particles does not exceed about 38 percent in order to have a continuous film, which will also depend on the size of the particles. It is more preferable that the percentage by weight of the poly(tetrafluoroethylene) particles be between about 2 to about 30 percent by volume of resin. It is most preferable that the total amount of poly(tetrafluoroethylene) particles is about 24 percent by volume of resin.

The fluorinated polyurethane coating compositions of the present invention may be applied to any type of golf ball cover material such as Balata, SURLYN®, IOTEK®, polyolefins, polyurethane and the like. The coatings are formed by depositing the coating solution comprising the reaction product of a fluorinated polyol and a curing agent, optionally dispersed in a solvent, on the cover of a golf ball. The coating solution can be deposited by any conventional application method employed in the golf ball coatings art such as spray, dip, spin, electrostatic or flow coating methods. The coating solution should be applied so as to form a layer of a uniform thickness around the entire outer surface of the golf ball cover. The coating solution is then cured to form a fluorinated polyurethane.

In another embodiment, the present invention is directed to a golf ball comprising a core, a cover, a coating composition layer and at least one primer layer, wherein the primer layer is disposed between the cover and coating composition layer and the coating composition layer is the outermost layer and comprises a fluorinated polyurethane. The primer layer promotes the adhesion to the substrate of the coating composition layer and smoothes rough areas on the ball surface, thereby enhancing the appearance and general durability of the golf ball. Both the primer layer and coating composition layer should be applied in a uniform thickness.

Any of a number of primer compositions conventionally used with coating compositions for golf balls are contemplated as being used with fluorinated polyurethane coatings used in the present invention. Preferably, the primer layers of the present invention are water-based, such as a waterborne epoxy/acrylic/urethane resin system. However, solvent-based primer systems also may be used in the present invention. When a primer layer is employed, it is preferable that this layer be deposited prior to the application of the solution of the coating composition containing the fluorinated polyol. The primer layer is applied in such a manner as to result in a layer of uniform thickness. The viscosity and solids content of the primer layer can be adjusted by the addition of a suitable solvent such as water or any solvents known in order to facilitate its application to the ball. The primer layer can be deposited through any conventional application methods known in the art such as spray, dip, spin, electrostatic or flow coating methods. The primer layer should be allowed to air dry until tack-free before depositing the fluorinated polyol thereon, unless a wet-on-wet primer system is employed. Depending upon the material employed in, e.g., the golf ball cover, more than one primer layer may be required. For example, golf balls having a urethane or a balata cover may require two layers of primer.

The preferred thicknesses of the coating composition layer and optional primer coat layer(s) will vary depending upon the type of material to be coated. Nonetheless, the coating composition layer of the present invention should have a cured thickness of about 0.01 mils to about 3.0 mils. Preferably, the coating composition layer of the present invention has a cured thickness of less than about 2.0 mils.

When a primer layer is employed in the present invention, it should have a thickness of about 0.01 mil to about 1 mil. All thicknesses disclosed herein refer to the dry film thickness of each layer. Preferably, the primer layer is less than about 1.0 mil thick and the coating composition layer is less than about 2.0 mils thick.

As noted above, golf balls having a protective coating composition layer comprising the fluorinated polyurethane compositions described herein can have a reduced coefficient of friction on their outer surfaces. Accordingly, golf balls having coating composition layers as taught herein are characterized as having a "slippery" or "slick" outer surface with a very low surface energy. This slippery or slick characteristic of the outer layer imparts at least two beneficial properties to the ball: 1) it makes it easier to clean the ball; and 2) may result in a modification of the spin rate imparted to the ball when the ball is struck with a golf club.

In particular, golf balls with the presently claimed fluorinated polyurethane coating composition layer have superior cleaning capabilities due to their relatively low surface energy, which decreases the ability of soil, sand and other materials to adhere to the surface of the ball. Likewise, soil or other material that does manage to adhere to the surface of the ball will be removed more easily as compared to conventional polyurethane coatings.

Further, since their surfaces have a relatively lower coefficient of friction compared to balls having a non-fluorinated polyurethane coating, golf balls formed according to the present invention will have a modified rate of spin as compared to balls having conventional protective coatings. Because the surface of the presently claimed balls is relatively "slick" due to this reduced coefficient of friction, when these balls are struck with a golf club, the face of the club which contacts the surface of the golf ball will encounter less friction as compared to that which occurs upon striking a conventional ball. Accordingly, when impacting the surface of the ball with the face of the club, less spin can be imparted to the golf ball because as the club moves across the ball's outer surface, it encounters less resistance than upon striking the surface of a conventional ball. The effect of any coating applied upon the club face must be taken into account as well. Therefore, the coating compositions of the present invention may be employed to alter the spin characteristics of golf balls.

An additional advantage of the presently claimed coating compositions results from the moisture absorption properties of fluorinated polyurethanes. Golf balls with a conventional polyurethane coating composition are known to absorb moisture after exposure to ambient atmospheric conditions over a period of time, resulting in a decrease in the velocity of the ball when struck with a club. This decrease in velocity is generally proportional to the decrease in the overall distance the ball travels when struck by a club. However, because of their low moisture absorption properties, the present fluorinated polyurethane coating compositions form excellent vapor barriers, thus decreasing the absorption of moisture into the core of the golf ball. Therefore, golf balls having the present fluorinated polyurethane coating compositions applied to their outer surface better maintain their initial velocity, and thus overall distance, as compared to conventional golf balls.

Likewise, as a result of their enhanced thermal and ultraviolet stability, the coating compositions used with the invention are more resistant to degradation due to exposure to elevated temperatures and/or ultraviolet radiation. The coating compositions of conventional golf balls degrade after being subjected to elevated temperatures for a prolonged period of time. Such degradation is usually manifested by a yellowing of the clear or white coating compositions, which is aesthetically unappealing and impacts negatively on the public perception of the overall quality of the golf ball. However, because of their excellent thermal and ultraviolet stability, the present fluorinated polyurethane coating composition compositions help prevent undesirable degradation as evidenced by yellowing.

The following is a representative example of a batch formulation for a fluorinated polyurethane coating composition of the present invention. However, it is to be understood that this example is provided only for illustrative purposes and in no way is the present invention limited to the specific disclosures therein.

EXAMPLE 1

Composition of PTFE-pigmented Fluoropolyethylene Coating

|  | % by Volume of Coating Solution |
|---|---|
| Poly(tetrafluoroethylene) | 13.15 |
| Titanium dioxide | 2.99 |
| Fluoropolyol resin | 16.38 |
| Methyl isobutyl ketone | 48.59 |
| Dibutyl tin dilaurate solution | 0.79 |
| Biuret of hexamethylene diisocynate solution | 18.10 |

I claim:

1. A golf ball comprising a core, a cover and a coating composition layer deposited upon at least a portion of an outer surface of said cover, said coating composition layer comprising of a fluorinated polyurethane resin and a particulate material which comprises a plurality of poly (tetrafluoroethylene) particles.

2. The golf ball according to claim 1 wherein the fluorinated resin comprises a reaction product of a fluorinated polyol and a curing agent.

3. The golf ball of claim 2 wherein said curing agent is an isocyanate.

4. The golf ball of claim 2, wherein the coating composition layer comprises at least about 1.0% by weight of said fluorinated polyurethane resin.

5. The golf ball of claim 2, wherein the coating composition layer comprises at least about 10.0% by weight of said fluorinated polyurethane resin.

6. The golf ball of claim 2, wherein the coating composition layer comprises at least about 50.0% by weight of said fluorinated polyurethane resin.

7. The golf ball of claim 1, wherein said poly (tetrafluoroethylene) particles comprise between about 2 to about 30% by volume of said coating composition.

8. The golf ball of claim 1, wherein said poly (tetrafluoroethylene) particles comprise about 24% by volume of said coating composition.

9. The golf ball of claim 1, wherein said poly (tetrafluoroethylene) particles comprise less than about 38% by volume of said coating composition.

10. The golf ball of claim 1, wherein the coating composition layer has a thickness of less than about 3.0 mils.

11. A golf ball comprising a core and a cover and having a coating composition layer deposited upon an outer surface of said cover, said coating composition layer formed by a process comprising:

(a) dissolving a fluorinated polyol in a solvent;

(b) reacting said polyol with a polyisocyanate to form a urethane reaction product;

(c) adding a particulate material which comprises a plurality of poly(tetrafluoroethylene) particles to the reaction product;

(d) applying the reaction product to the surface of the golf ball.

12. The golf ball of claim 1, wherein the fluorinated polyol is formed by reacting at least two diols and an additional reactant.

13. The golf ball of claim 12 wherein said diols are selected from the group consisting of;

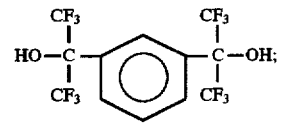

(I)

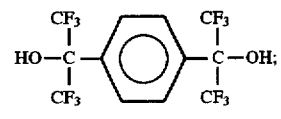

(II)

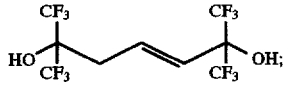

(III)

-continued

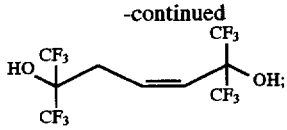
(IV)

HOCH$_2$(CF$_2$CF$_2$CF$_2$)$_n$CH$_2$OH (V)
wherein n ≥ 1; and

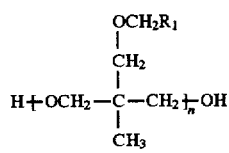
(VI)

wherein R$_1$ = C$_n$F$_{2n+1}$ and n ≥ 1.

wherein R$_1$=C$_n$F$_{2n+1}$ and n≥1.

14. A golf ball comprising:

a core;

a cover;

at least one layer of a primer material deposited upon an outer surface of said cover; and at least one top coat layer deposited upon said primer, said topcoat material comprising a fluorinated polyurethane resin and a particulate material which comprises a plurality of poly(tetrafluoroethylene) particles.

15. The golf ball of claim 14, wherein said primer material comprises a water-based or solvent-based polymer.

16. The golf ball of claim 14 wherein the primer layer is less than about 1.0 mils thick and the top coat is less than about 2.0 mils thick.

17. A method for making a coated golf ball comprising:

forming a golf ball comprising a core and a cover; and depositing upon at least a portion of an outer surface of said cover a coating composition formed by:

(a) dissolving a fluorinated polyol in a solvent (b) reacting said polyol with a polyisocyanate to form a urethane reaction product;

(c) adding a particulate material which comprises a plurality of poly(tetrafluoroethylene) particles to the reaction product.

18. The method of claim 17, which further comprises reacting at least two diols and an additional reactant to form the fluorinated polyol.

19. The method of claim 18 wherein said diols are selected from the group consisting of

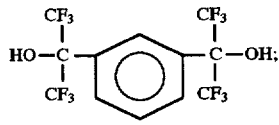
(I)

(II)

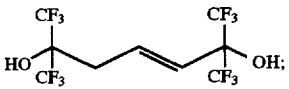
(III)

(IV)

HOCH$_2$(CF$_2$CF$_2$CF$_2$)$_n$CH$_2$OH (V)
wherein n ≥ 1; and

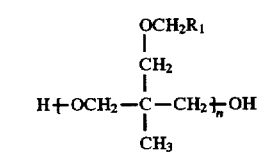
(VI)

wherein R$_1$ = C$_n$F$_{2n+1}$ and n ≥ 1.

20. The method of claim 17, which further comprises:

(a) dissolving the reaction product in a solvent; and (b) curing the coating composition on said golf ball surface.

21. The method of claim 17, wherein the solvent is selected from the group consisting of methyl isobutyl ketone, methylamyl ketone, methyl isoamyl ketone or a mixture of n-butyl acetate and xylene.

22. The method of claim 17, which further comprises depositing a primer layer upon the outer surface of the golf ball and thereafter depositing the coating composition layer upon at least a portion of the primer layer.

23. The method of claim 17, wherein said reaction product comprises about a 1:1 ratio of an OH to an NCO functionality.

* * * * *

UNITED STATES PATENT AND TRADEMARK OFFICE
CERTIFICATE OF CORRECTION

PATENT NO. : 5,744,549

DATED : April 28, 1998

INVENTOR(S) : Mitchell E. Lutz

It is certified that errors appear in the above-identified patent and that said Letters Patent is hereby corrected as shown below:

In claim 12, line 1, please change "claim 1," to read --claim 11,--.

In claim 13, in the last line of the claim, please delete "$R_1 = C_nF_{2n+1}$ and $n \geq 1$.".

Signed and Sealed this

Seventh Day of July, 1998

Attest:

BRUCE LEHMAN

Attesting Officer

Commissioner of Patents and Trademarks